UNITED STATES PATENT OFFICE.

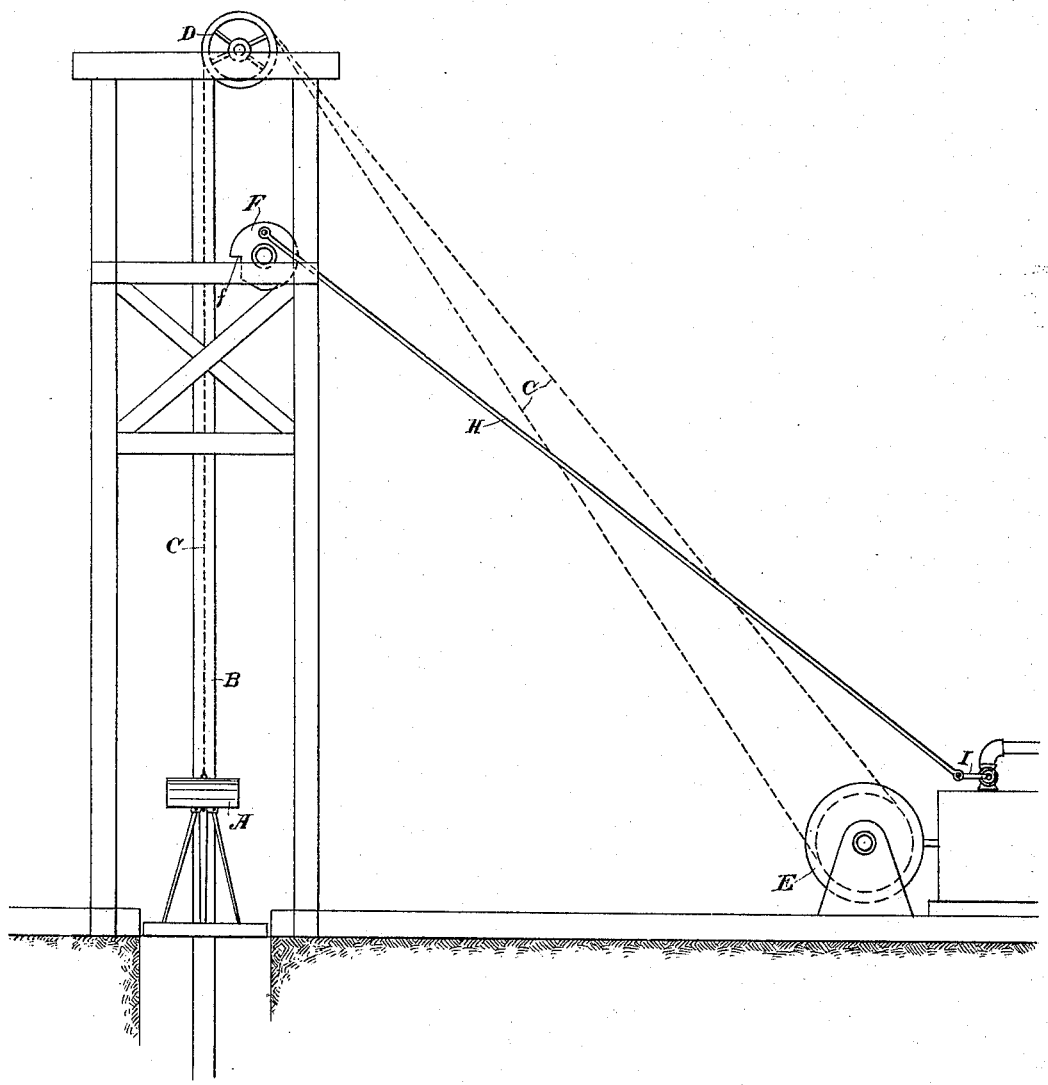

THOMAS HENRY OXNAM, OF LOS ANGELES, CALIFORNIA.

SAFETY ATTACHMENT FOR HOISTING MACHINERY.

SPECIFICATION forming part of Letters Patent No. 641,145, dated January 9, 1900.

Application filed September 26, 1899. Serial No. 731,748. (No model.)

*To all whom it may concern:*

Be it known that I, THOMAS HENRY OXNAM, a citizen of the United States, residing at Los Angeles, county of Los Angeles, State of California, have invented an Improvement in Safety Attachments for Hoisting Machinery; and I hereby declare the following to be a full, clear, and exact description of the same.

My invention relates to a device for preventing accidents to hoisting machinery by reason of the cage being carried up into the sheaves of the gallows-frame by accident or carelessness.

It consist of a device actuated by the cage when the latter is carried upward beyond its proper point and connections between said device whereby the actuating mechanism is thrown out of gear or prevented from operating.

It also comprises details of construction, which will be more fully explained by reference to the accompanying drawings, in which the figure is a general view of my improvement.

The object of my invention is to prevent dangerous and fatal accidents which occur in operating all hoisting machinery by reason of the cage being carried up beyond its proper stopping place and into contact with the sheaves or other part, whereby breakages are caused. This device may be applied to any form of hoisting machinery, whether actuated by steam, electricity, air, water, or other power, and it will be manifest that by suitable mechanical arrangement it may be applied to any such apparatus.

In the present case I have illustrated my invention as applied to a hoist which is actuated by a steam-engine.

A represents the cage, guided and movable between the guide-posts B, and C is a hoisting-cable passing over the sheaves D at the top of the "gallows-frame," so called, and thence passing to the winding-drum E, upon which it is coiled to raise the cage and from which it is uncoiled to lower it.

F is a wheel having a portion cut out, as shown at *f*. The periphery of the wheel projects into the line of travel of the cage, and the wheel is suitably journaled at some point upon the gallows-frame intermediate between the sheaves and the point where the cage should stop, so that if the cage passes above this point it will contact with the wheel and cause it to turn.

H is a rod or equivalent connection between the wheel and the lever I, by which the throttle-valve of the engine or other equivalent controlling mechanism is actuated, and when the wheel is turned it operates through this rod to either shut off steam, air, or water or cut off the electrical circuit, so that the hoisting-power will be automatically thrown out of action. In this manner the cage will be stopped without the attention of the engineer or operator and will be prevented from passing the point of safety.

Having thus described my invention, what I claim as new, and desire to secure by Letters Patent, is—

1. The combination with a cage and the hoisting mechanism therefor, of a wheel journaled in the shaft at right angles to the path of movement of the cage and having a peripheral stop disposed in the path of the cage, a motor having a valve controlling the hoisting mechanism, and a rod or connection having one portion attached to the valve and another portion eccentrically and directly connected with the wheel whereby the axial movement of the latter imparts an endwise pushing movement to the rod or connection and actuates the valve.

2. The combination with a cage and the hoisting mechanism therefor, of a wheel journaled transversely in the shaft and having a portion of its periphery cut away and lying in the path of movement of the cage, a controlling mechanism having a valve controlling the power to the hoisting mechanism, a lever on the valve, and a rod connected directly with said lever and directly and eccentrically connected with the wheel whereby an axial movement of the latter moves the rod in the direction of its length and actuates the valve.

In witness whereof I have hereunto set my hand.

THOMAS HENRY OXNAM.

Witnesses:
ALPHONSO C. DAY,
JOHN WILLIAMS.